United States Patent [19]

Ito et al.

[11] Patent Number: 4,856,916
[45] Date of Patent: Aug. 15, 1989

[54] CONDUCTING ROLLING BEARING

[75] Inventors: Hideji Ito, Kuwana; Koji Kametaka, Kawasaki; Yukihisa Tsumori, Kuwana, all of Japan

[73] Assignee: NTN Toyo Bearing Co., Ltd., Osaka, Japan

[21] Appl. No.: 221,827

[22] PCT Filed: Sep. 19, 1987

[86] PCT No.: PCT/JP87/00692
§ 371 Date: Mar. 30, 1988
§ 102(e) Date: Mar. 30, 1988

[51] Int. Cl.⁴ ............................................. F16C 33/72
[52] U.S. Cl. ................................. 384/477; 277/96.1; 277/236; 384/476; 384/484
[58] Field of Search ............... 384/477, 476, 482–486; 277/96.1, 236

[56] References Cited

U.S. PATENT DOCUMENTS 2,067,464  1/1937  Smith ................................. 384/484
4,533,265  8/1985  Woodbridge ..................... 384/477

FOREIGN PATENT DOCUMENTS 44-19641  8/1969  Japan .
46-18725  6/1971  Japan .
48-16026  5/1973  Japan .

Primary Examiner—Thomas R. Hannon
Attorney, Agent, or Firm—Wenderoth, Lind & Ponack

[57] ABSTRACT

In a conductive rolling bearing comprising an inner ring (11), an outer ring (12), a plurality of rolling elements (13) mounted between the inner ring and the outer ring, and seal members for sealing the space between the inner ring and the outer ring, the seal members have one end thereof secured to one of the inner ring and the outer ring and the other end thereof in an elastic, sliding contact with a seal wall surface (18) formed on the other. The free end (19) of the seal member (15) is bent outwardly of the bearing and the seal member (15) is in a sliding contact with the seal wall surface (18) on its bent portion (20). This arrangement gives the effects of providing a low, stable torque for the bearing and of improving the seal performance of the bearing. This conductive rolling bearing is used in a steering assembly of an automobile and bearing assemblies having a bearing near electrical devices.

7 Claims, 2 Drawing Sheets

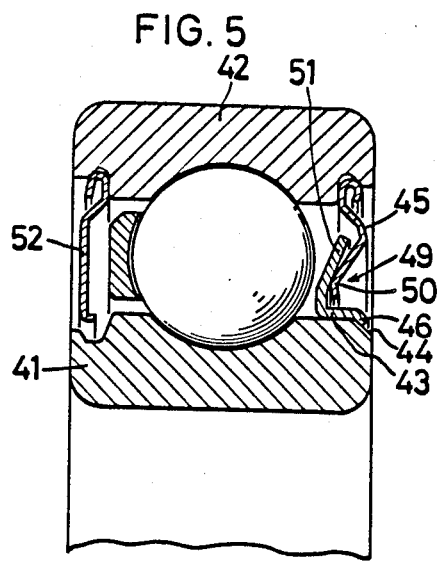
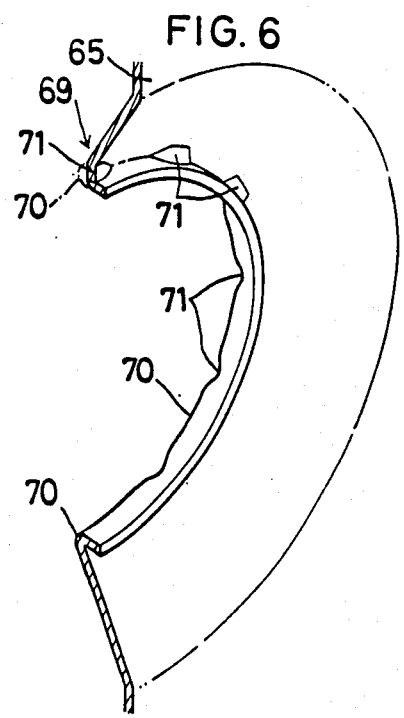
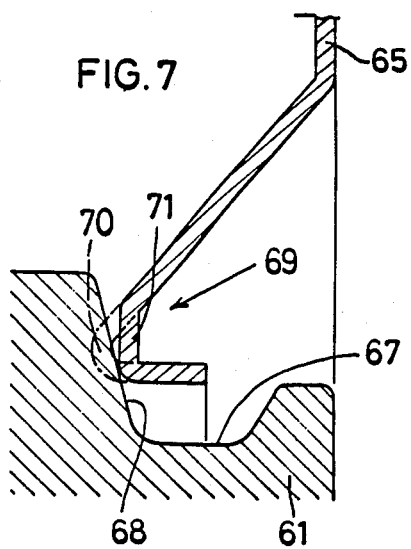
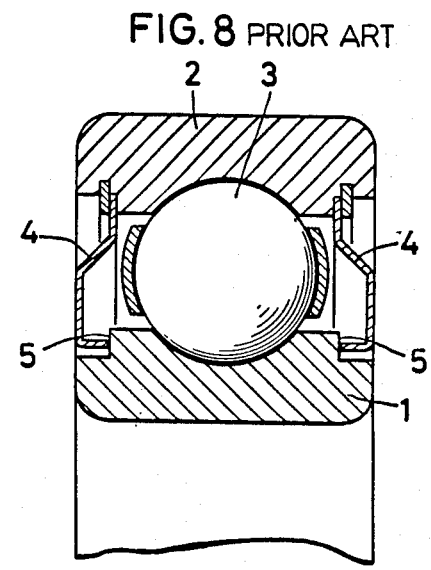

CONDUCTING ROLLING BEARING

FIELD OF TECHNOLOGY

The present invention relates to a conductive rolling bearing mounted on a steering assembly of an automobile or on a bearing assembly having a bearing near electrical devices such as an electric motor, and more specifically a conductive rolling bearing adapted for conduction between inner and outer rings through seal members.

Technological Background

With this type of bearing, an electric current may sometimes flow through rolling elements between outer and inner rings. This causes an electrical discharge to occur between the rolling elements and the inner and outer rings, locally melting the bearing (what is called electrolytic corrosion) and thus remarkably shortening the service life of the bearing.

Japanese Utility Model Non-examined Publication No. 56-143273 discloses a bearing which allows a current to flow between inner and outer rings without causing such an electrolytic corrosion. As shown in FIG. 8, the bearing of this Publication is provided with seal members 4 which are so arranged that if a current flows through the bearing, it will flow between an inner ring 1 and an outer ring 2 through the seal members 4 and not through rolling elements 3, thus protecting the inner ring 1, the outer ring 2 and the rolling elements 3 from electrolytic corrosion.

Since the seal members 4 are frictionally pressed with a light resilient pressure against the shoulder portions 5 formed near the end faces of the inner ring 1, they not only prevent electrolytic corrosion but also function as ordinary seal members to prevent the invasion of dust or mud and the leakage of bearing grease.

In the bearing, in order to reduce the torque for the bearing, the frictional surfaces, that is, the end faces of the seal members and the shoulder portions are machined flat and smooth to reduce the friction therebetween. But owing to the edged corner at the end face of the seal members, they were not satisfactory in their wear and sealing properties.

Further, after punching to form a bore, it is necessary to machine the end faces of the seal members to remove burrs and edges. This increases the cost of the bearing.

DISCLOSURE OF THE INVENTION

In the present invention, the seal members have their free end curled so that the curled portion will resiliently contact the frictional seal contact surface on the bearing ring. This arrangement has the following effects:

(a) Even if the contact areas displace owing to axial clearance in the bearing or uneven dimensions of the parts, the contact pressure on the contact surface of each seal member is unchanged. Thus, the frictional resistance is kept constant, allowing the bearing to rotate with a low and stable torque.

(b) Even if the assembling of the bearing is inaccurate and thus the inner and outer rings are mounted in inclined positions with respect to each other, the seal members will be kept in unchanged frictional contact, allowing the bearing to rotate with a stable torque.

(c) The seal members maintain their frictional contact in such a stable manner that the bearing has a high and stable sealing property.

(d) The seal members are so smooth in frictional contact that wear is slow to progress and thus the powder produced by friction is less likely to invade into the bearing and lower the service life of the bearing.

(e) Without the necessity of incorporating any special conduction device, the bearing of the present invention allows an even, secure conduction.

BRIEF DESCRIPTION OF THE DRAWINGS

FIG. 5 shows a fourth embodiment of the present invention.

FIG. 6 is a perspective view of a free end of a seal member used in the present invention.

FIG. 7 is an enlarged view of a portion of the free end of the seal member.

FIG. 8 show a prior art bearing.

DETAILED DESCRIPTION OF THE PREFERRED EMBODIMENTS

Now, the embodiments according to the present invention will be described with reference to FIGS. 1 to 7.

Figure 1:
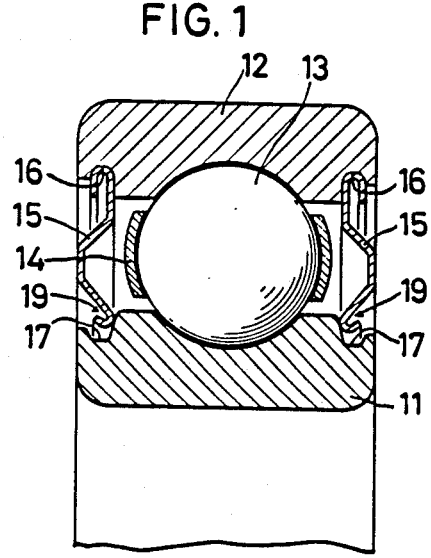
FIG. 1 illustrates the first embodiment of the present invention.
Figure 2:
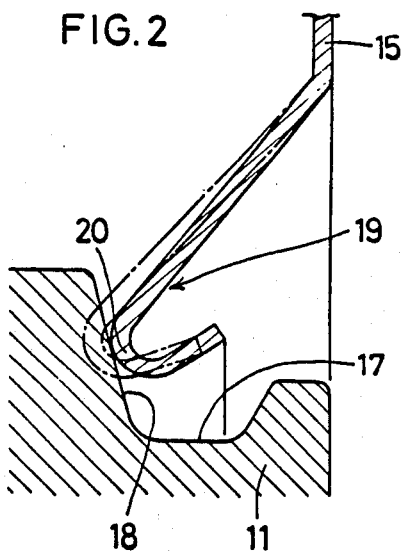
FIG. 2 is an enlarged view of a portion of FIG. 1.

FIGS. 1 and 2 show the rolling bearing of the first embodiment according to the present invention. It comprises an inner ring 11, an outer ring 12, balls 13 interposed therebetween, and a retainer 14 rotatably holding the balls 13.

The outer ring 12 is formed at its inner periphery near both ends thereof with grooves 16 for receiving seal members 15. The seal members have their outer peripheral portion caulked so as to be fixed to the outer ring 12.

The inner ring 11 is formed with seal grooves 17 of a substantially U-shaped section in its outer periphery near both ends thereof. Their inner side wall surface 18 is slightly inclined. A free end 19 of each seal member 15 curls arcuately outwardly of the bearing at 20. This arcuate portion 20 is in frictional contact with the side wall surface 18 with its own elasticity.

The seal members 15 are made by press molding a copper alloy such as phosphor bronze, which is superior in conductivity to the bearing material of which the inner ring 11, the outer ring 12 and the balls 13 are made. A current flows between the inner ring 11 and the outer ring 12 through the sealing member 15 to protect the inner ring 11, the outer ring 12 and the balls 13 from electrolytic corrosion.

Since the free end 19 of each seal member 15 has its arcuate portion 20 in frictional engagement with the inner wall surface 18 of the seal groove 17, even if the contact areas between the seal members and the seal grooves should displace owing to axial clearance in the bearing or manufacturing errors, the frictional resistance remains unchanged because the frictional contact surface of the seal members 15 is arcuate. This allows the bearing to rotate with a small and stable torque.

Further, since the seal members have a high sealing property owing to their smooth contact surface, they also will serve satisfactorily as ordinary seal means.

Figure 3:
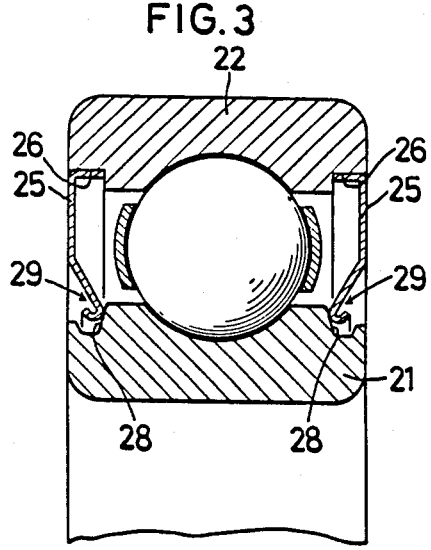
FIG. 3 shows a second embodiment of the present invention.

FIG. 3 shows the second embodiment of the present invention in which an outer ring 22 is formed on its inner periphery at both ends with cutouts 26 for receiving seal members 25. The outer peripheral portion of each seal member 25 is press-fit into the respective cutouts 26.

The way of contact between the free end 29 of each seal member 25 and the inner wall surface 28 of the respective seal groove is identical to that of the first embodiment, and we do not discuss it again.

Figure 4:
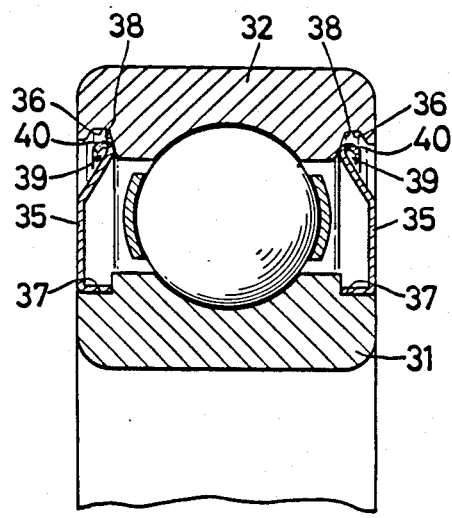
FIG. 4 shows a third embodiment of the present invention.

FIG. 4 shows the third embodiment of the present invention in which an inner ring 31 is formed on its outer periphery at both ends thereof with cutouts 37 adapted to receive seal members 35. An outer ring 32 is formed at its inner periphery near both ends with seal grooves 36. Seal members 35 have their free end 39 in frictional engagement with the seal grooves 36. The free end 39 arcuately curls outwardly of the bearing.

The arcuate portion 40 is in frictional contact with the slightly inclined inner wall surface 38 of each seal groove 36 with a resilient pressure. If the bearing is of a type in which the outer ring is rotated, the arrangement of this embodiment is effective.

FIG. 5 shows the fourth embodiment of the present invention in which a seal member 45 is received on the inner periphery of an outer ring 42 near both ends thereof and has a free end 49 bent outwardly of the bearing. A frictional contact member 43 having a substantially L-shaped section is press-fit on the outer periphery of an inner ring 41 near its end. The frictional contact member 43 is axially positioned by getting its elbow portion 46 into engagement with a side chamfer 44 formed on the outer periphery of the inner ring 41.

The seal member 45 has its elbow portion 50 in frictional engagement with the outer surface 51 of the frictional contact member 43. The elasticity of these two members compensates for any errors in assembling the bearing.

Even if the relative position between the inner ring 41 and the outer ring 42 should axially displace, the seal member 45 is kept in contact with the frictional contact member 43, maintaining the current conduction between the inner and outer rings, thereby protecting the bearing from electrolytic corrosion while keeping their sealing properties. This arrangement allows the use of an ordinary seal 52 to seal the other end of the bearing.

FIGS. 6 and 7 are enlarged fragmentary views showing the free end of a seal member of the fifth embodiment according to the present invention.

A seal member 65 has its arcuate portion 70 formed with a plurality of ribs 71 so that the edge of the seal member 65 will not be cut apart owing to wear at the arcuate portion 70 by the frictional contact with the inner wall surface 68 of a seal groove 67 when the inner ring 61 is in rotation. The ribs 71 are formed by radially indenting the arcuate portion 70.

If the dents of the ribs 71 are as deep as the thickness of the seal member, it would be enough to prevent the separation of the edge from the body owing to the wear.

Industrial Application

The conductive rolling bearing according to the present invention is intended to be incorporated in an automotive steering assembly or a bearing assembly having a bearing near an electrical device such as an electric motor and therefore will find applications in various industrial fields such as the automotive industry.

We claim:

1. A conductive rolling bearing, comprising:
   an inner bearing ring;
   an outer bearing ring;
   a plurality of rolling elements mounted between said inner bearing ring and said outer bearing ring;
   at least one electrically-conductive relative rigid metallic seal member for sealing a space between said inner bearing ring and said outer bearing ring, said at least one seal member having one end secured to one of said inner bearing ring and said outer bearing ring and an opposite end having a bent portion bent in a direction away from said plurality of rolling elements adjacent the other of said inner bearing ring and said outer bearing ring;
   said other of said inner bearing ring and said outer bearing ring having a seal wall surface disposed thereon;
   said bent portion Comprising a curved contact segment elastically and slidably contacting said seal wall surface and a terminal end segment connected to said curved contact segment but held out of contact with said seal wall surface.

2. The conductive rolling bearing as set forth in claim 1, wherein:
   said bent portion of said at least one seal member has a plurality of ribs spaced from one another about said seal member and extending radially with respect to said inner and outer bearing rings.

3. The conductive rolling bearing as set forth in claim 1, wherein:
   said electrically conductive relatively rigid metallic seal member is made of a copper alloy.

4. The conductive rolling bearing as set forth in claim 3, wherein:
   said copper alloy is phosphor bronze.

5. The conductive rolling bearing as set forth in claim 1, wherein:
   said curved contact segment is disposed between said terminal end segment and said one end secured to one of said inner bearing ring and said outer bearing ring.

6. The conductive rolling bearing as set forth in claim 1, wherein:
   said other of said inner bearing ring and said outer bearing has a groove therein; and
   said groove includes said seal wall surface.

7. The conductive rolling bearing as set forth in claim 1 wherein:
   said other of said inner bearing and said outer bearing has a frictional contact member attached thereto; and
   said frictional contact member includes said seal wall surface.

* * * * *